Sept. 2, 1941.    G. VOGEL    2,255,031
METHOD OF WORKING AN ENDLESS RUBBER BAND INTO THE WELTS OF HOSIERY
Filed Dec. 29, 1939    2 Sheets-Sheet 1
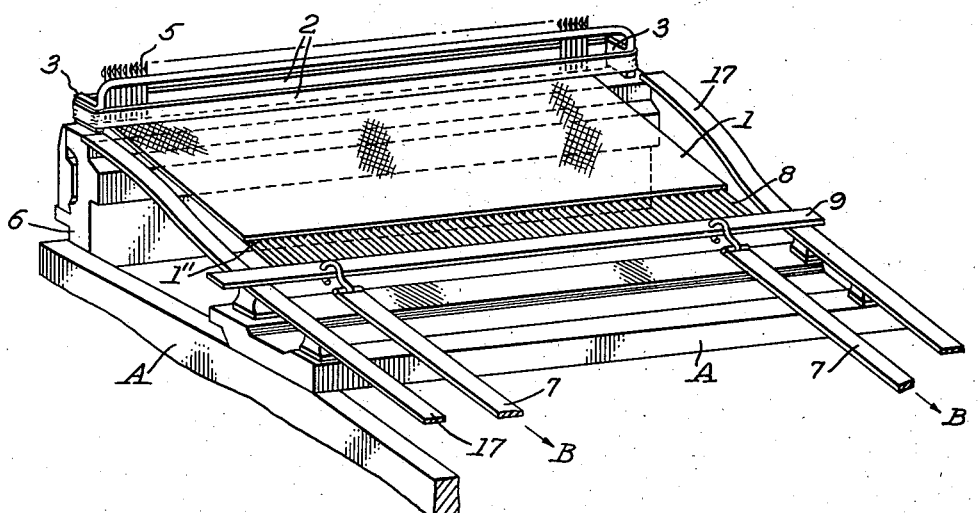
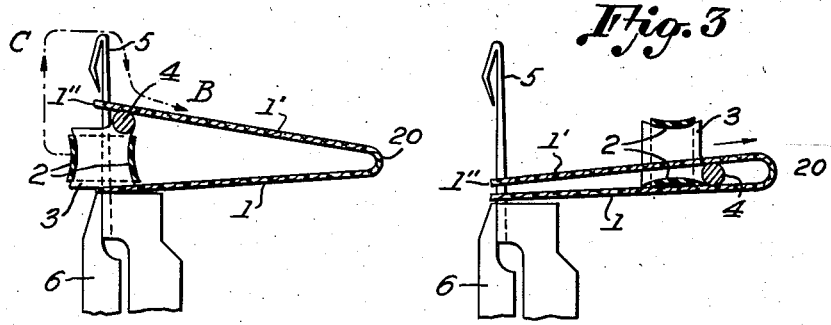
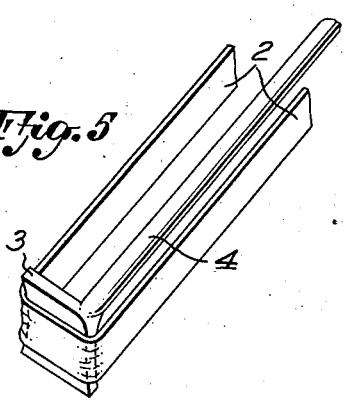
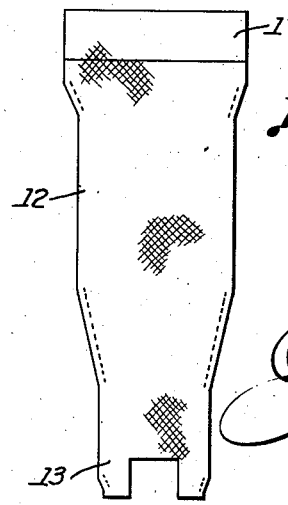
Inventor
Georg Vogel

UNITED STATES PATENT OFFICE 2,255,031

METHOD OF WORKING AN ENDLESS RUBBER BAND INTO THE WELTS OF HOSIERY

Georg Vogel, Siegmar-Schonau, Saxony, Germany

Application December 29, 1939, Serial No. 311,610
In Germany January 24, 1935

4 Claims. (Cl. 66—147)

This invention relates to flat hosiery frames and is particularly directed to a method of working an endless, solid rubber band into a portion of a flat piece of fabric, particularly hosiery or the like, while the latter is still in the process of manufacture on a flat hosiery frame, whereupon that portion of the piece of fabric after the introduction of the rubber band is transformed into the welt.

A rubber band worked into the welt of hosiery must, after the stocking or half hose has been finished on the machine, that is to say, after the leg portion and foot portion have likewise been completed and after the longitudinal edges have been sewn together, possess a sufficient amount of elastic or tensioning strength to provide for the stocking a safe and reliable hold on the leg of the wearer. Moreover, in order to be concealed from the eye, the rubber band must be enclosed between the front portion and back portion of the welt so that it is completely covered up by the material. For the aforementioned reasons it is necessary to put the endless rubber band in stretched condition around the flat and outspread welt portion before the latter has been closed and to artificially maintain the rubber band in that stretched condition until the welt has been formed and until all of the other portions of the stocking have been produced, if the rubber band is introduced into the welt in this way it is possible for the rubber band to contract when the stocking is taken from the machine and when the artificial stretching or tensioning means have been removed. When after this the longitudinal edges of the stocking are brought together and united by sewing the rubber band including that portion of it which formerly was exposed to the eye will disappear in the fold of the welt and will completely be covered up by the material. All this is old and well known to the art.

The object of the present invention is to find a simple and satisfactory way of putting the endless rubber band around the flat welt portion while the latter is still spread out on the frame, that is to say, before it has been folded up to form the welt.

I solve this problem by, first, producing the flat welt portion in the customary way on the needles of a flat hosiery frame, then, placing the endless rubber band in stretched condition around the frame needles, then, forming the welt by closing the welt portion, and then, tilting the rubber band over the needle tops and onto the upper welt portion, whereby the rubber band when its movement continues becomes enclosed within the welt.

One important advantage of my invention resides in the feature that by slipping the rubber band from its position around the frame needles, that is to say, from the rear, into the welt it is only necessary to stretch the rubber band or rubber ring to such an extent that it just slightly exceeds in width the width of the flat welt portion.

Another likewise exceedingly valuable advantage is the fact that my method of tilting the rubber ring over the needle tops can easily be carried out and takes up very little time. In this respect it has to be taken into consideration that most of the flat hosiery frames, particularly the so-called "cotton" machines, have about 24 work-places, which means that 24 stockings are produced at the same time, and that these machines are operated by only one man.

A third advantage of my method resides in the feature that by slipping the rubber band and its tensioning member onto a portion of the already doubled up welt the rubber ring and its tensioning member will not come in contact with the bars on which the ends of the welt bar slide while the flat welt portion is being manufactured, for which reason no friction between the slide bars and the rubber ring with harmful effects for the latter can take place and also no clinging of the rubber ring to the slide bars with serious drawbacks for the easy operation of the draw-off mechanism.

Still another important advantage of my invention results from the way in which I am utilizing the per se known draw-off bar, prior to the transfer of the first row of stitches of the flat welt portion to the frame needles, that is to say, before the closing of the welt has taken place, as a tensioning member for the rubber ring. In the manufacture of hosiery provided with welts the use of a draw-off bar is necessary and cannot be dispensed with, and by simultaneously utilizing the draw-off bar as a tensioning member for the rubber band I have found an additional function for the draw-off bar which makes the employment of a special tensioning member unnecessary.

In order to make my invention more readily understood I will now proceed to describe it with the aid of the accompanying drawings which form a part of this specification and in which the same reference numerals indicate the same or corresponding parts. However, it is to be understood that changes, variations and modifications which come within the scope of the claims hereunto appended can be resorted to.

In the drawings:

Fig. 1 is a perspective view of a portion of a "Cotton"-machine, showing the rubber ring mounted on the tensioning member and placed around the frame needles, showing further the flat welt portion almost completed and almost ready to be closed to form the welt.

Fig. 2 is a side view, partly in section, of a portion of the same machine showing the position of the rubber ring and its tensioning member after the first row of stitches has been transferred to the frame needles.

Fig. 3 is a side view, partly in section, of a portion of the same machine, showing the position of the rubber ring and its tensioning member after the transfer of the rubber ring and its tensioning member to the upper portion of the doubled-up welt.

Fig. 5 is a fragmentary detail view of the tensioning member with the rubber band mounted on it.

Fig. 6 is a diagrammatic illustration of a stocking after its completion on the machine.

Figure 4:
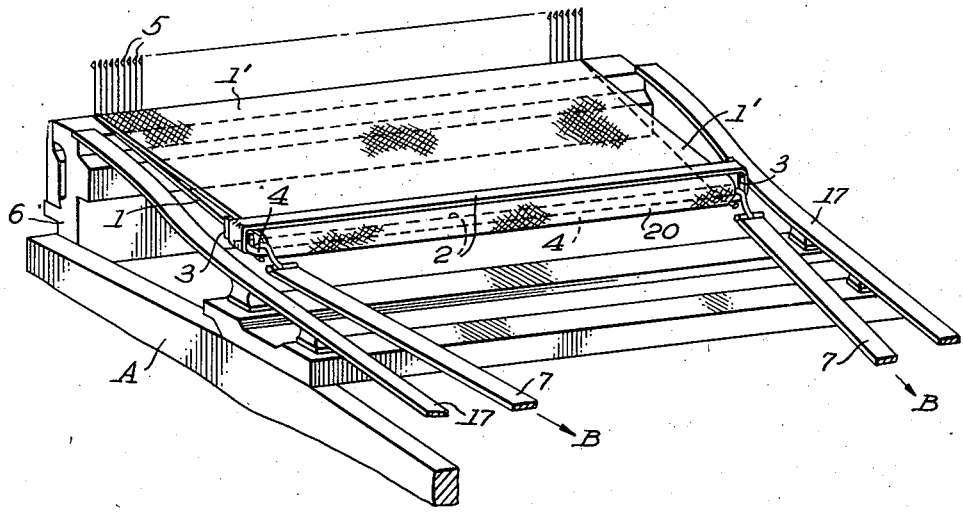
Fig. 4 is a perspective view of the same machine after the formation of the welt, showing the tensioning member for the rubber ring connected to the draw-off means.

In Fig. 1 of the drawings 1 is a piece of a welt portion produced row after row by the frame needles 5 of the flat hosiery frame A. The row of stitches 1'' which was the first to be produced by the needles 5 is farthest away from the frame needles now, while the last row of stitches that has just been formed is still in the immediate proximity of the needles. 9 is the welt bar provided with the needles 8 corresponding in number to the number of stitches of a row of stitches and engaging with the hooks at their free ends the loops of the first row of stitches 1''. The welt bar 9 is supported in its position by two bars 17 which are rigidly mounted in the machine frame and which serve as slide-bars for the free ends of the welt bar 9. Detachably fastened to the welt bar 9 are the draw-off bands 7 for exercising a constant pull on the welt bar 9 with the result that the welt portion 1 during the entire period of its production is kept in a state of constant tension and drawn in the direction indicated by the arrows B. When in course of the production the flat welt portion has obtained a sufficient length the machine is stopped and the solid endless rubber band 2 inserted in the machine. For this purpose the rubber band is first mounted on a tensioning member 4 by which it is considerably stretched and then placed around the frame needles 5 in such manner that it surrounds the lower portion of the needle shafts. In order to prevent the rubber band from getting too close to the needles and thus prevent the orderly working of the latter the tensioning member 4 is at both of its ends provided with a flange 3 for keeping the rubber band at a proper distance from the needles.

Figure 7:
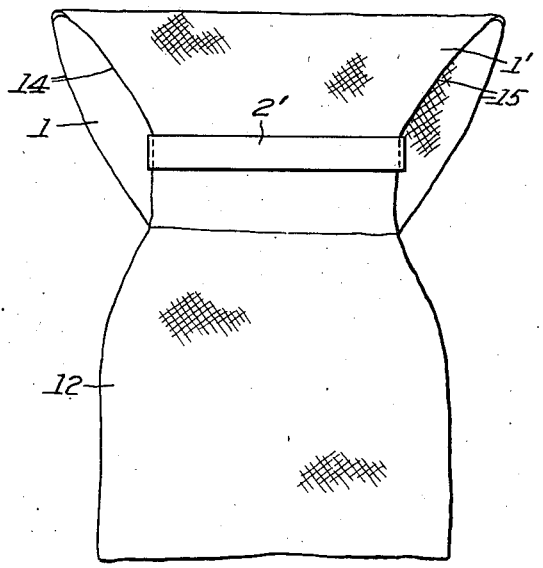
Fig. 7 is a view of the welt and a part of the leg portion immediately succeeding the removal of the stocking from the machine.
Figure 8:
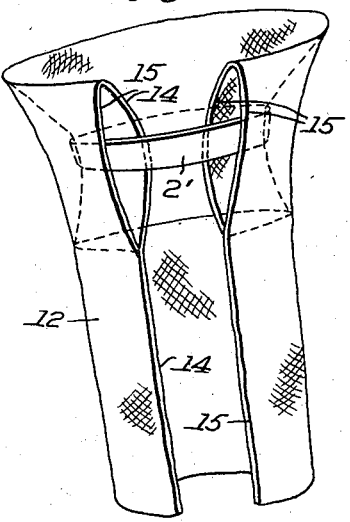
Fig. 8 is a view of the stocking illustrated in Fig. 7 immediately preceding the moment when the longitudinal edges are brought together.

When the manufacture of the flat welt portion has been finished the operator of the machine removes the draw-off bands 7 from the welt bar 9, whereupon the welt bar 9 transfers the first row of stitches 1'' from the hooks of its needles 8 to the frame needles 5, completing in this way the formation of the welt by depositing the upper welt portion 1' on top of the rubber band 2 and its tensioning member 4 as illustrated in Fig. 2. The next step to be taken is to transfer the rubber band from its position around the lower portions of the frame needles to a position around the upper portion 1' of the welt. This is accomplished by lifting the rubber band to the tops of the frame needles and by tilting it over the needle tops as indicated in Fig. 2 by means of the arrows C. The movement of the rubber band along the upper welt portion continues until the rubber band and its tensioning member have reached the end of the upper welt portion 1' at 20 where the welt reverses its direction and turns back toward the shafts of the frame needles. This position of the rubber band 2 and its tensioning member 4 is illustrated in Fig. 4. The operator now connects the draw-off bands 7 to the tensioning member 4, restarts the machine and continues the manufacture of the article until the leg portion 12 and the foot portion 13 (see Fig. 6) have likewise been finished. After this the stocking is taken from the machine and the tensioning member removed from the rubber band, thus making it possible for the rubber band to contract and tighten its grip on the welt portion 1' as illustrated in Fig. 7. When now the edges 14 and 15 are brought together the portion 2' of the rubber band disappears from sight by becoming enclosed between the outside portion 1 and the inside portion 1' of the welt as illustrated in Fig. 8. All that remains to do now is to complete the foot portion and to unite by sewing the longitudinal edges 14 and 15.

What I claim is:

1. The herein described method of working an endless rubber band into the welt of a piece of fabric consisting in producing a welt portion on the frame needles of a flat hosiery frame, placing the endless rubber band stretched to correspond to the width of the welt portion around the frame needles, transforming the welt portion into the welt, and enclosing the endless rubber band within the welt by tilting it over the frame needles.

2. The herein described method of working an endless rubber band into the welt of hosiery consisting in producing a welt portion on the frame needles of a flat hosiery frame, stretching the endless rubber band to correspond to the width of the welt portion by mounting it on a correspondingly dimensioned tensioning member, placing the endless rubber band with its tensioning member around the shafts of the frame needles, transforming the welt portion into the welt by transferring the first row of stitches to the frame needles, enclosing the endless rubber band and its tensioning member within the welt by tilting them over the needle tops onto the upper welt portion, and removing the tensioning member from the endless rubber band after removal of the finished article from the machine.

3. The herein described method of working an endless rubber band into the welt of hosiery consisting in producing a welt portion of the frame needles of a flat hosiery frame, mounting the endless rubber band on the draw-off bar suitably dimensioned for that purpose to stretch the rubber band to correspond to the width of the welt portion, placing the endless rubber band with the draw-off bar around the shafts of the frame needles, transforming the welt portion into the welt by transferring the first row of stitches to the frame needles, enclosing the endless rubber band and the draw-off bar within the welt by tilting them over the needle tops onto the upper welt portion, connecting the draw-off bar to the draw-off means and removing the draw-off bar from the endless rubber band after removal of the finished article from the machine.

4. The herein described method of working an endless rubber band into the welt of hosiery consisting in producing a welt portion on the frame needles of a flat hosiery frame, mounting the endless rubber band on the draw-off bar suitably fashioned for that purpose to stretch the rubber band to correspond to the width of the welt portion and to keep the oppositely disposed longitudinal inner faces of the mounted rubber band at a suitable distance from each other, placing the endless rubber band with the draw-off bar around the shafts of the frame needles, transforming the welt portion into the welt by transferring the first row of stitches to the frame needles, enclosing the endless rubber band and the draw-off bar within the welt by tilting them over the needle tops onto the upper welt portion, connecting the draw-off bar to the draw-off means, and removing the draw-off bar from the endless rubber band after removal of the finished article from the machine.

GEORG VOGEL.